UNITED STATES PATENT OFFICE.

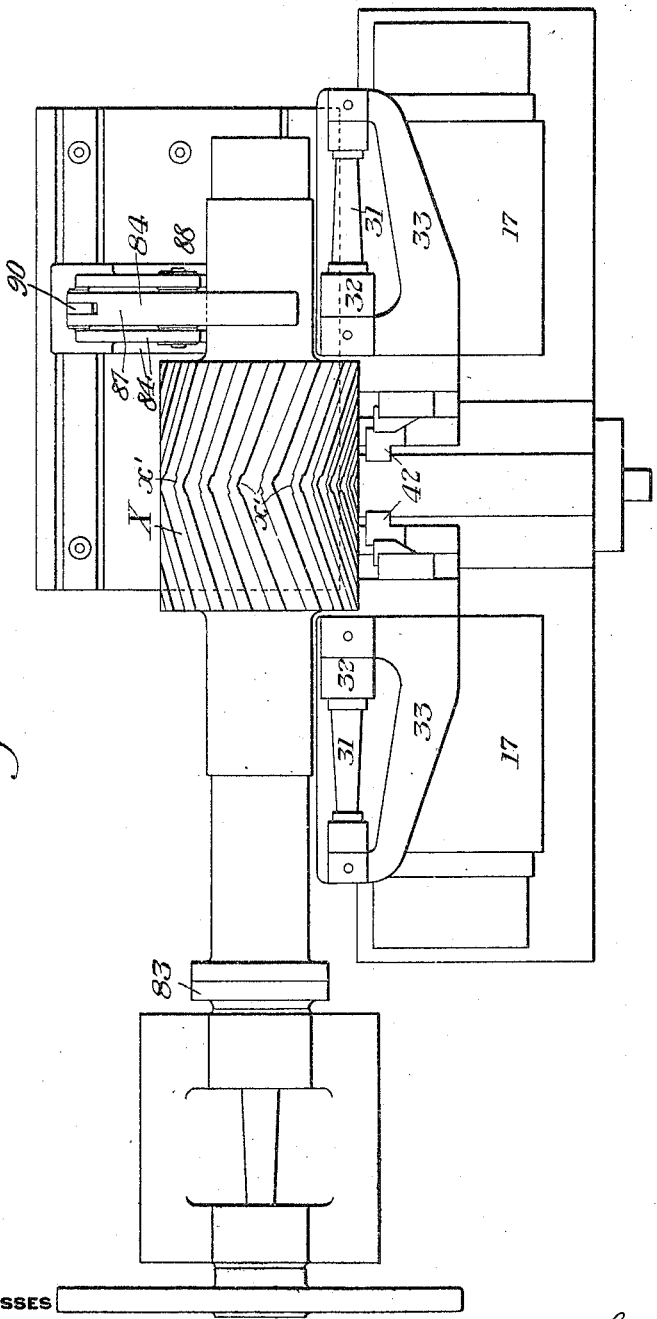

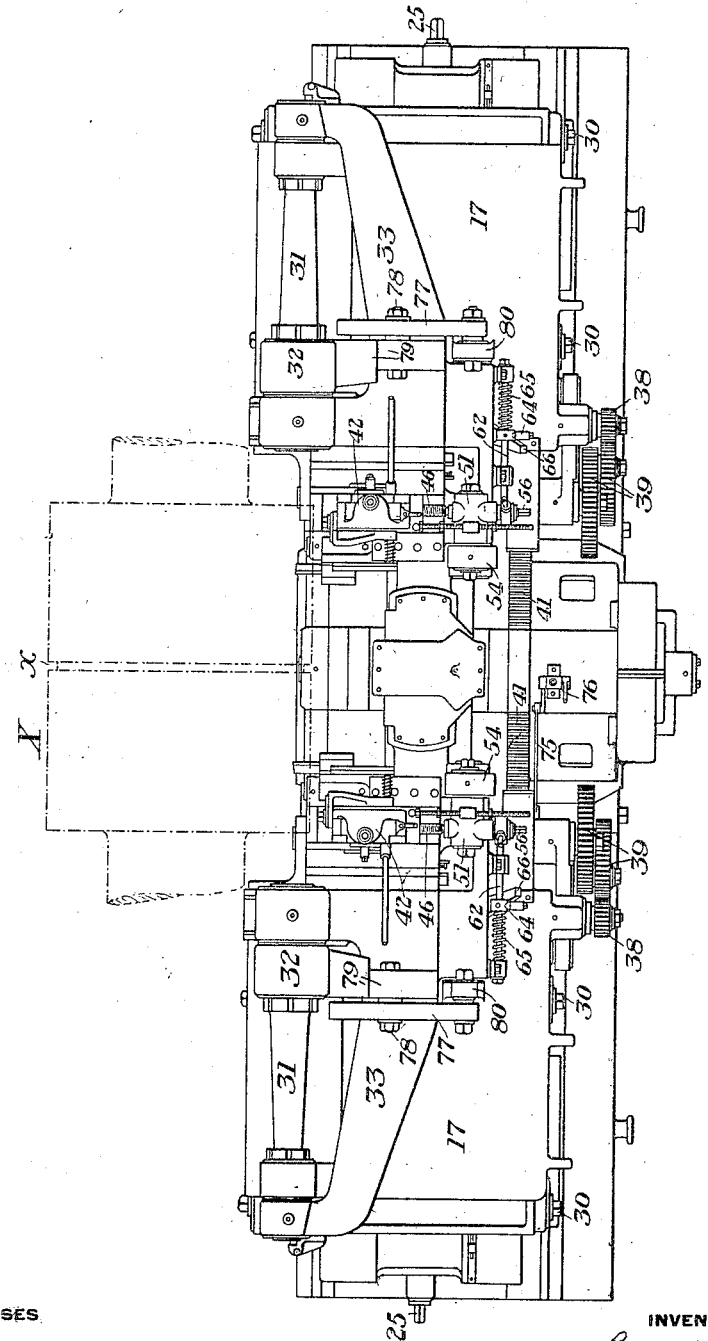

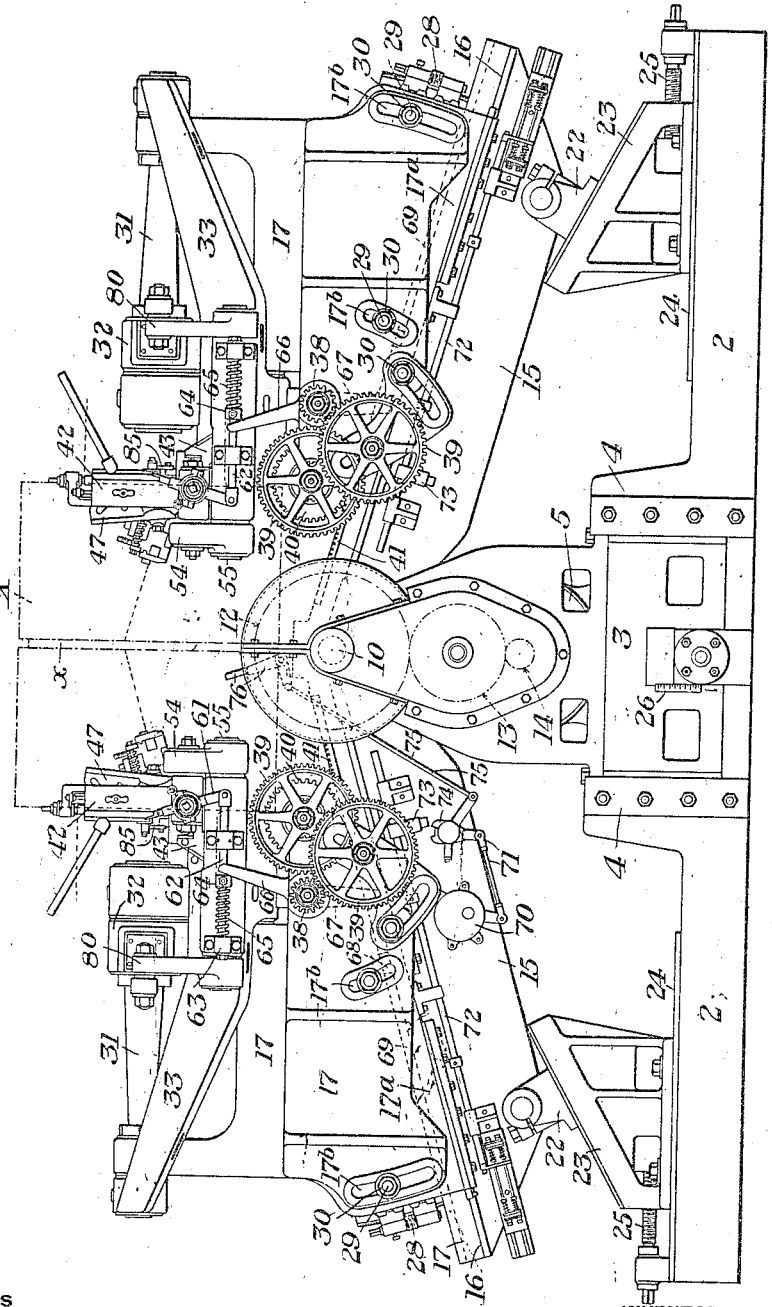

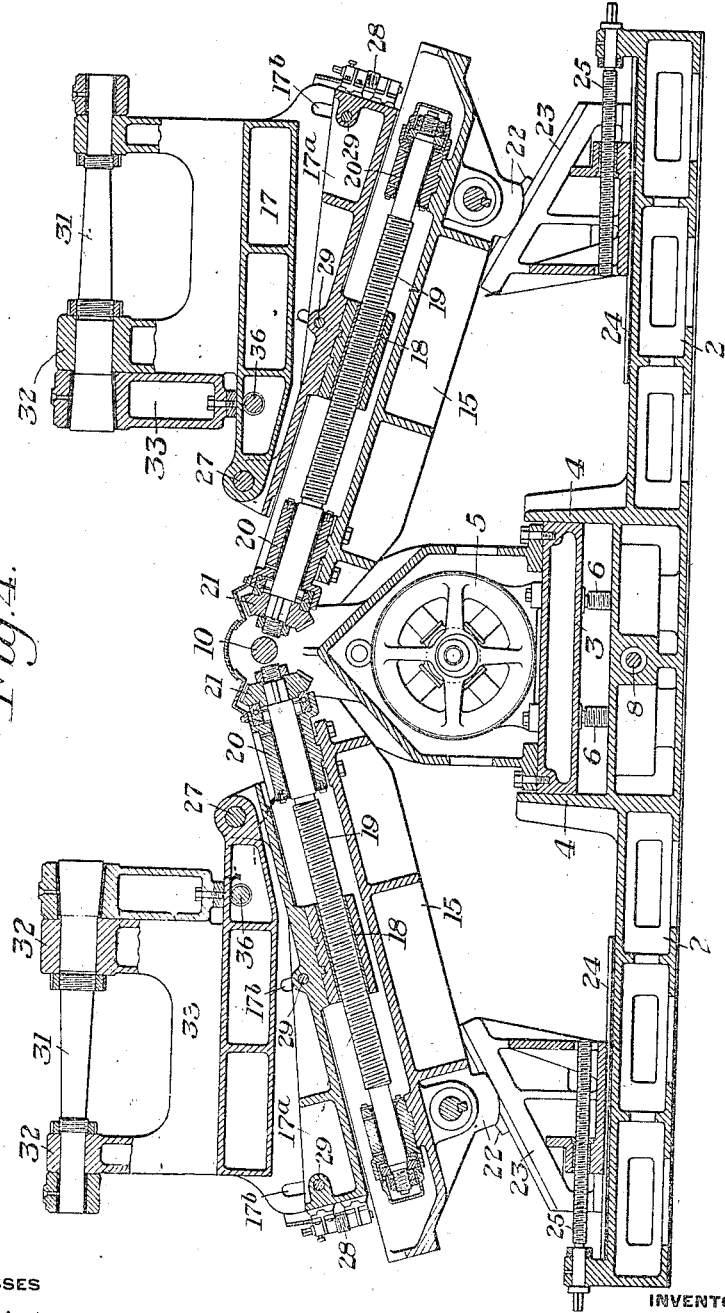

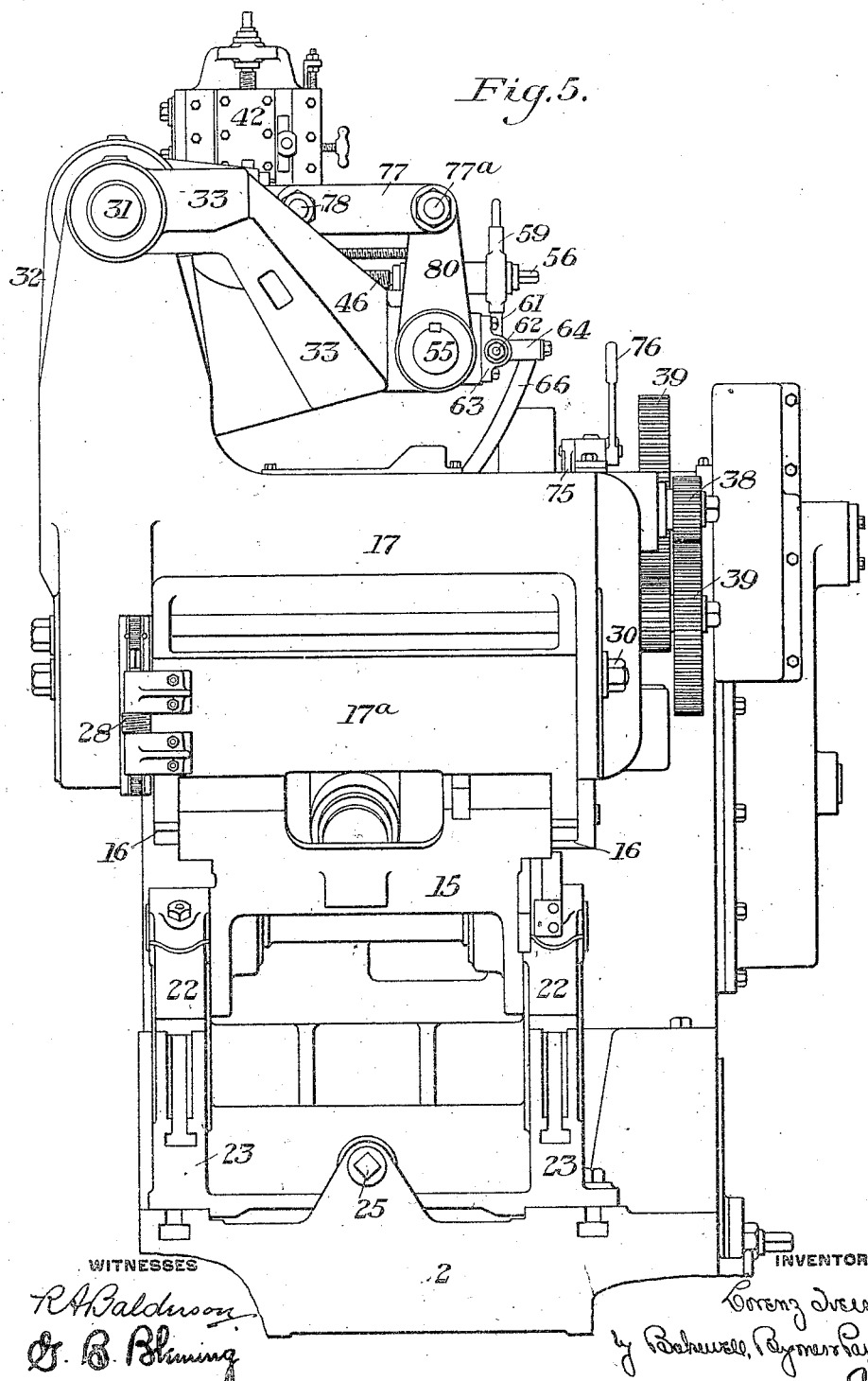

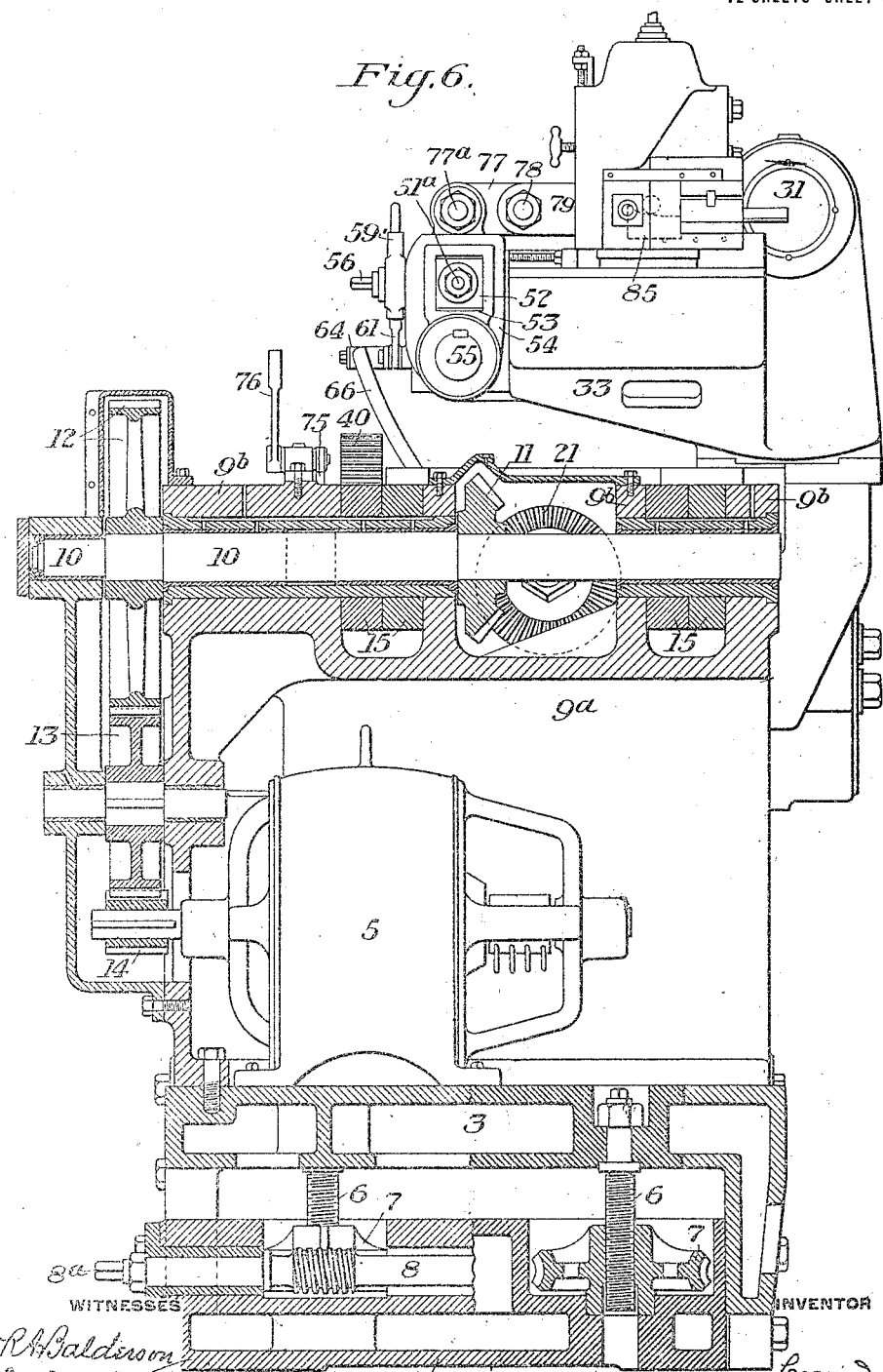

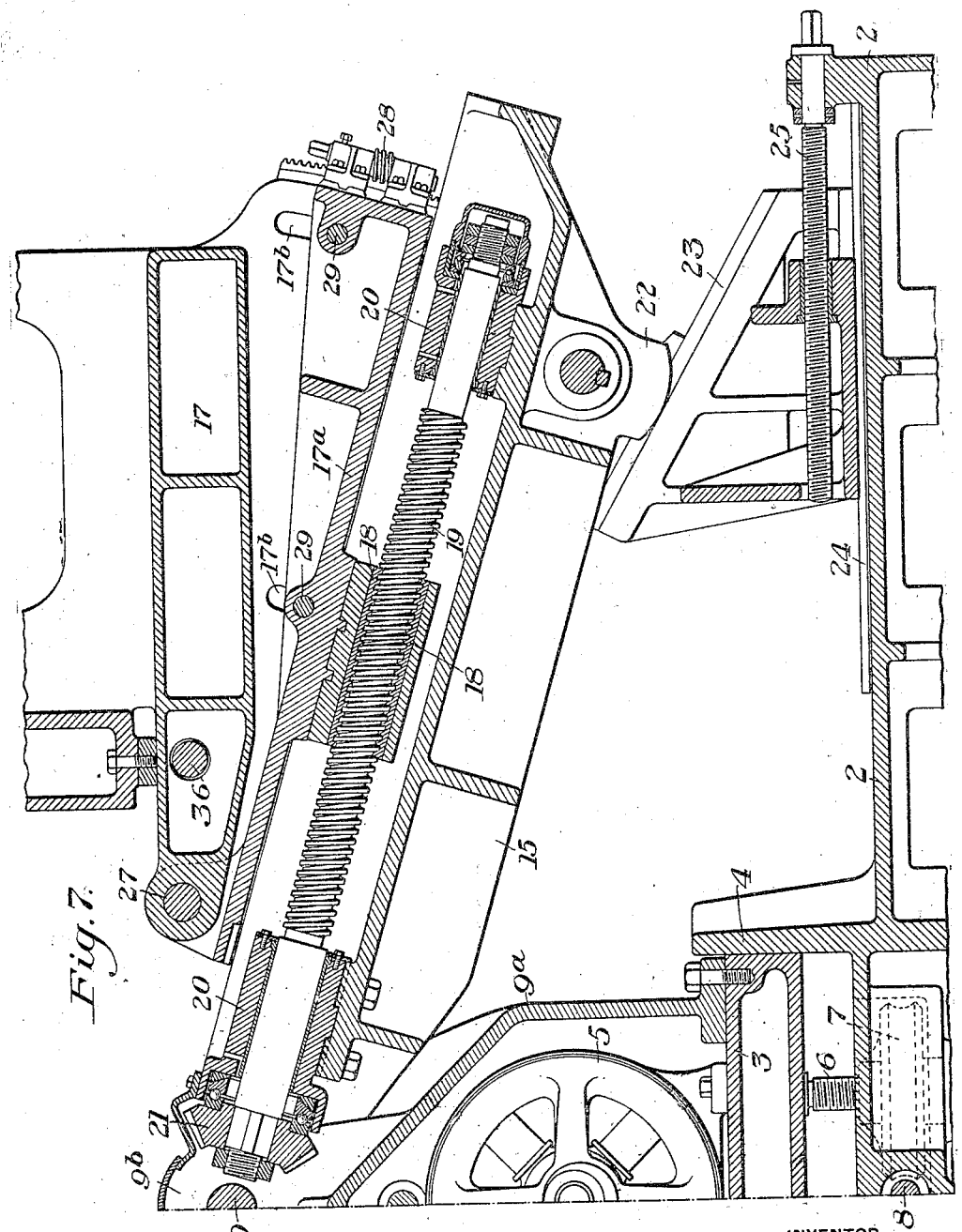

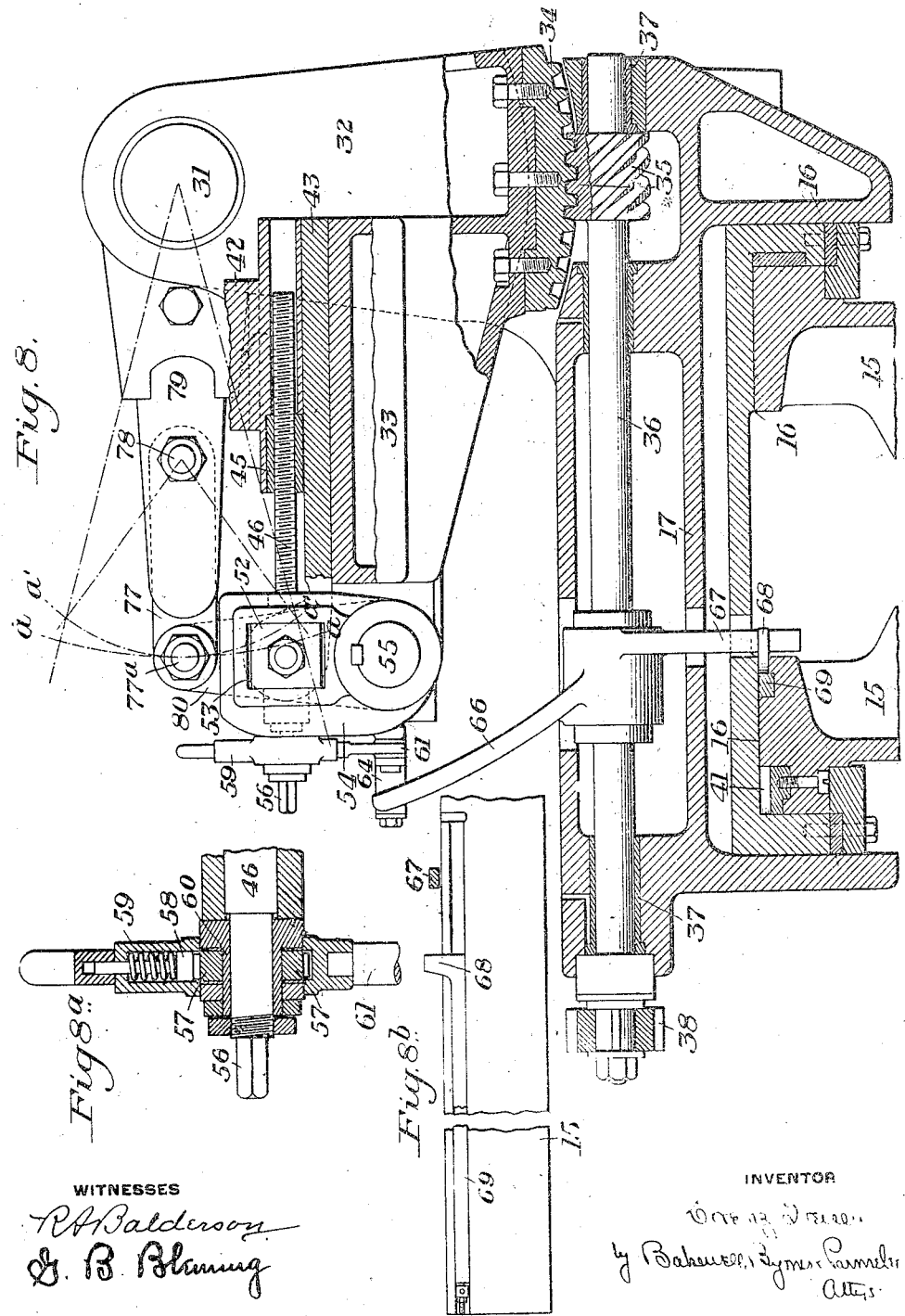

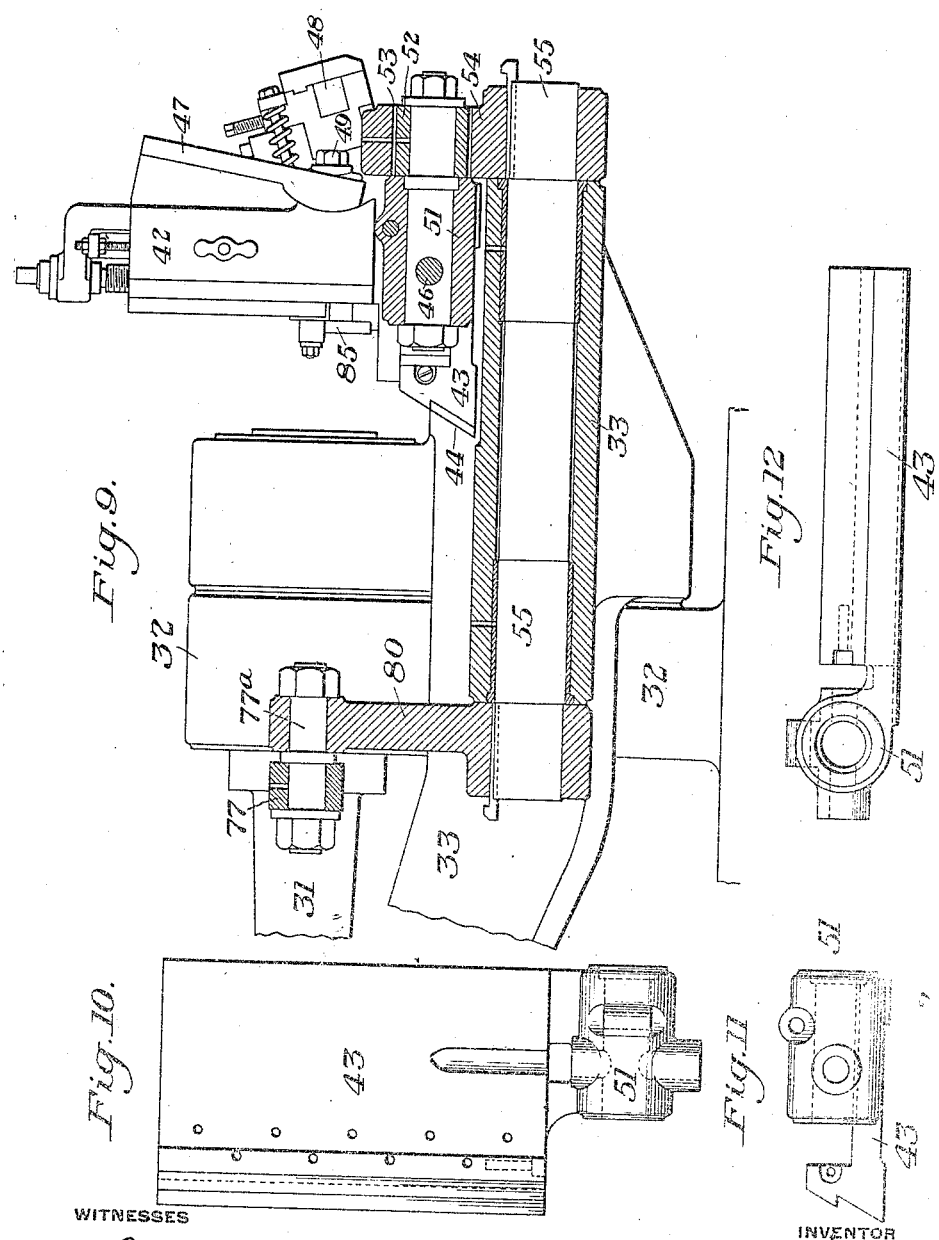

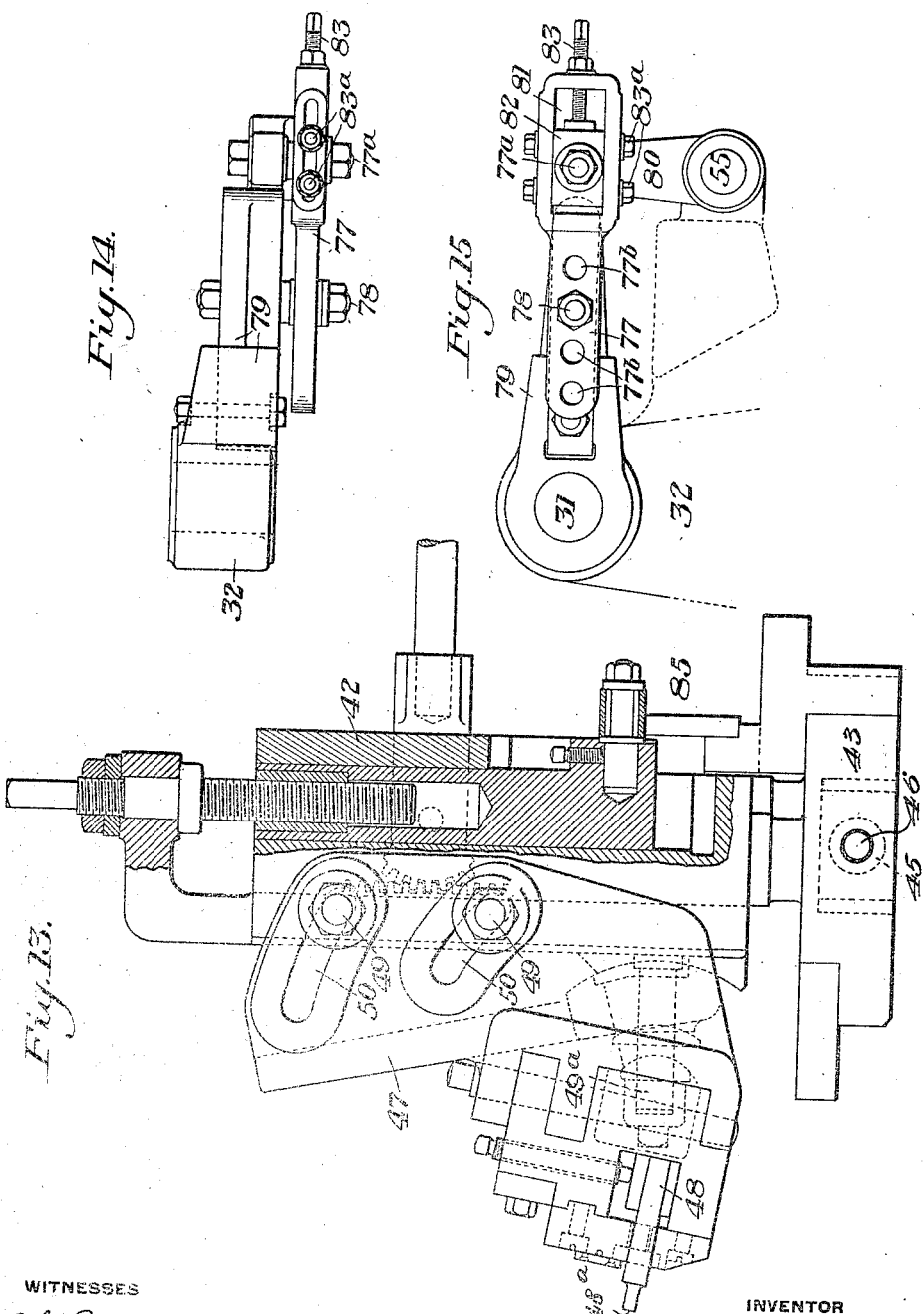

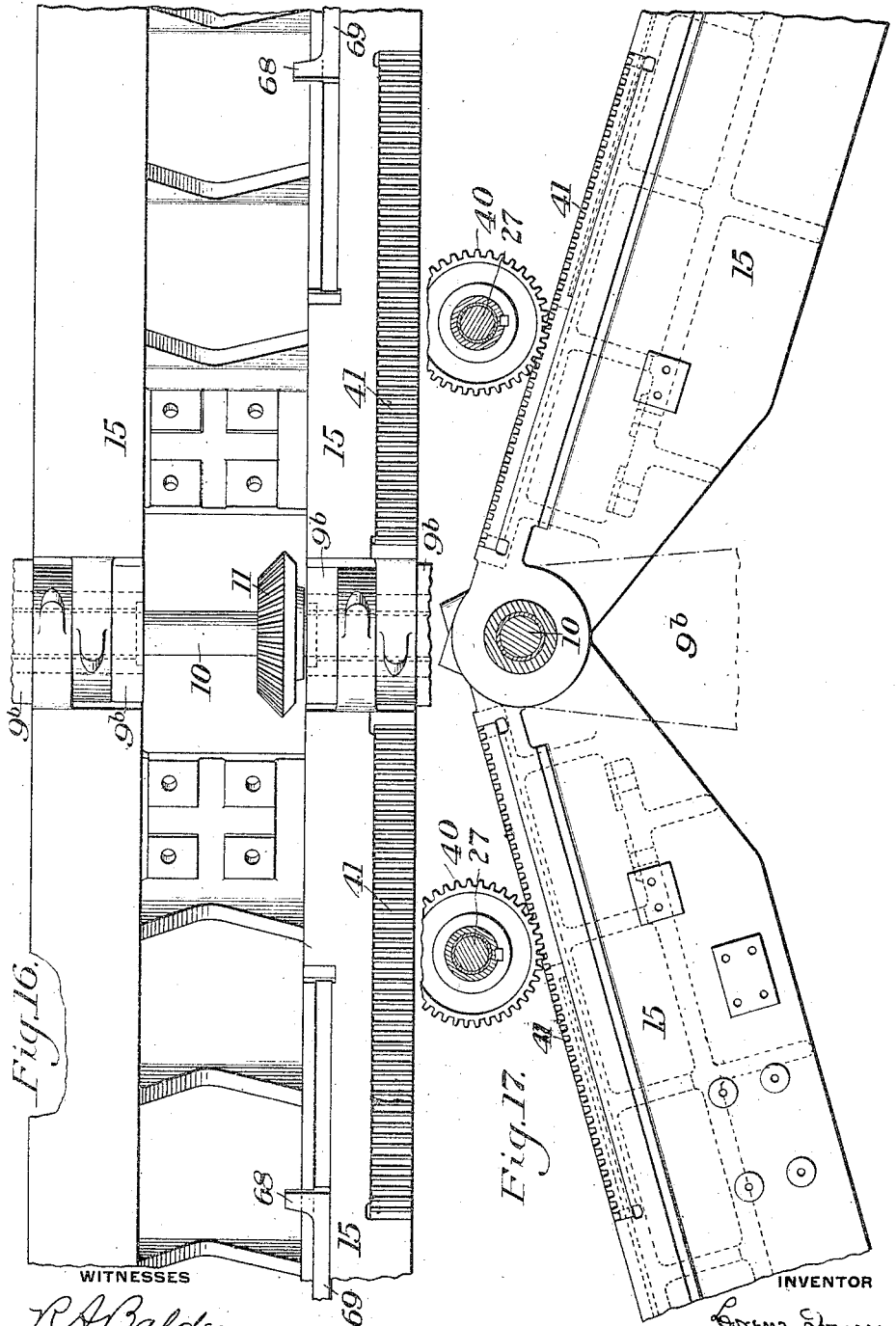

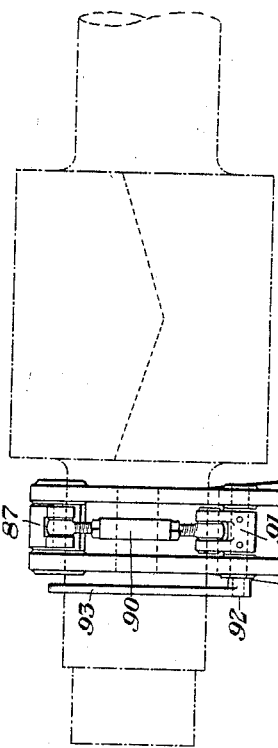
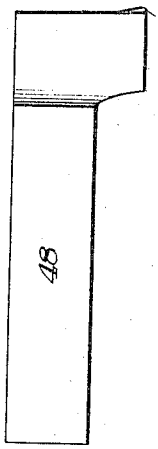
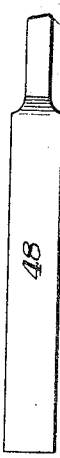
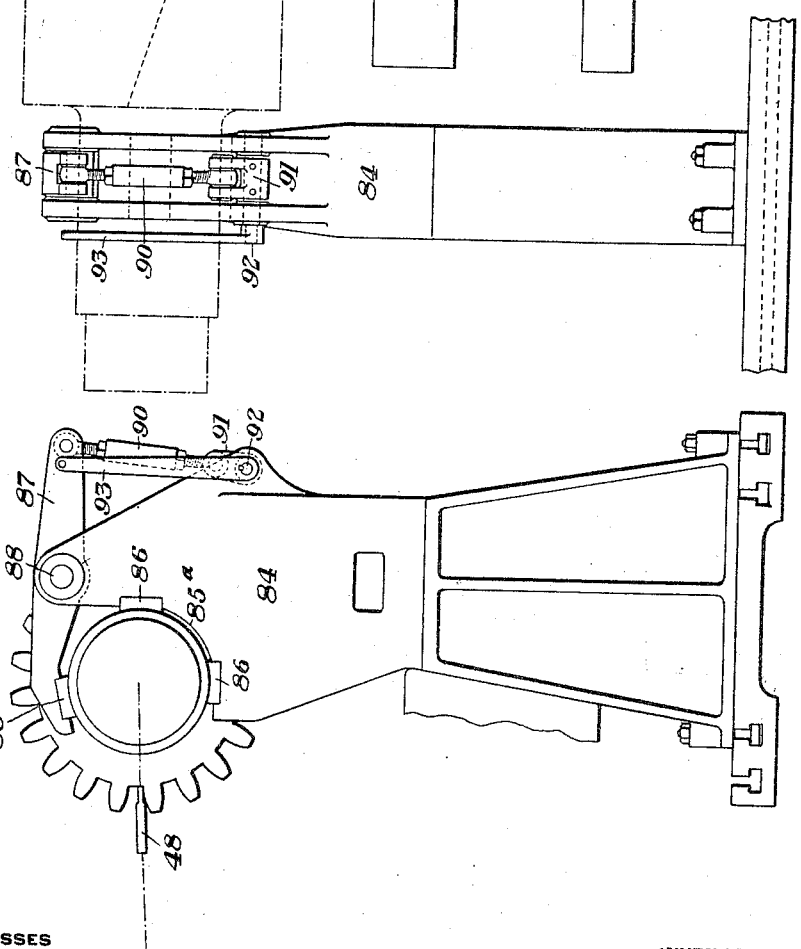

LORENZ IVERSEN, OF PITTSBURGH, PENNSYLVANIA, ASSIGNOR TO MESTA MACHINE COMPANY, OF PITTSBURGH, PENNSYLVANIA, A CORPORATION OF PENNSYLVANIA.

GEAR-PLANING MACHINE.

1,197,376.   Specification of Letters Patent.   Patented Sept. 5, 1916.

Application filed November 12, 1915. Serial No. 61,070.

*To all whom it may concern:*

Be it known that I, LORENZ IVERSEN, a citizen of the United States, residing at Pittsburgh, in the county of Allegheny and State of Pennsylvania, have invented a new and useful Improvement in Gear-Planing Machines; of which the following is a full, clear, and exact description, reference being had to the accompanying drawings, forming part of this specification, in which:

Figure 1 is a plan view largely diagrammatic showing the general arrangement of a machine embodying my invention and its relation to a gear blank and to the indexing mechanism for the blank; Fig. 2 is a plan view of an actual machine embodying the invention; Fig. 3 is a front elevation of the same; Fig. 4 is a sectional elevation; Fig. 5 is an end elevation; Fig. 6 is a view partly in end elevation and partly in vertical section; Fig. 7 is a vertical section of a portion of the machine; Fig. 8 is a detail sectional view showing a portion of the mechanism for oscillating one of the radial arms, together with a portion of the mechanism for reciprocating the compensating slide; Figs. 8$^a$ and 8$^b$ are detail sectional views showing portions of the feeding mechanism for the tool slide; Fig. 9 is a detail sectional view showing a portion of the mechanism for actuating the compensating slide; Figs. 10, 11 and 12 are detail views of the compensating slide; Fig. 13 is a view partly in elevation and partly in section of the tool head; Figs. 14 and 15 are detail views showing in plan and side elevation, respectively, a modified form of a portion of the compensator; Fig. 16 is a plan view of a portion of the machine showing the manner in which the inclined track members are pivoted; and Fig. 17 is a side view of the parts shown in Fig. 16, and also showing the pinions which actuate the corresponding radial arm. Fig. 18 is an end view showing one form of supporting and clamping device for the tail end of a blank. Fig. 19 is a front elevation of the same with the blank shown in dotted lines, and Figs. 20, 21 and 22 are, respectively, plan, side and end views of one form of cutting tool which may be employed.

My invention relates to a gear planing machine, and more particularly, to a machine for planing double helical or herringbone gears.

In all prior machines of this class with which I am familiar, it has been necessary, in order to produce the angular helical teeth, to rotate the gear blank during each cutting operation to an extent equal to the included angle between the two ends of a tooth. This necessitates the use of a complicated indexing mechanism having means for imparting this rotary movement thereto. It has been found impossible in such machines to prevent a certain amount of lost motion in the gears resulting in errors in the work performed.

One object of my invention is to provide a machine for cutting double helical or herringbone gears, in which the gear blank being cut may be held perfectly stationary and rigid between successive indexing movements. This not only permits the use of any ordinary indexing mechanism and greatly simplifies the latter, since it is only required to perform its regular indexing work, but it also eliminates lost motion, and thus errors in the work done.

A further object of my invention is to produce a machine of this character which is capable of cutting gears of largely varying sizes and tooth-angles, including gears and pinions of large diameters, and in which the changes necessary for different gears may be readily made.

In my improved machine, the desired helical form and angle of the teeth is produced wholly by compound movements imparted to the tool head and tool, the blank being held rigid during each cutting operation, as above stated. The invention also permits the use of planer heads and planer tools which may be generally similar in form to those ordinarily used in machines for planing spur gears.

My invention also provides a machine which is simple and durable in its construction and by which the gears may be cut more rapidly than has heretofore been possible.

The nature of my invention may be best understood by reference to the accompanying drawings, in which I have shown the preferred embodiment thereof, it being premised, however, that various changes can be made in the details of construction and arrangement of the parts, without departing from the spirit and scope of my invention as defined in the appended claims.

In these drawings, the numeral 2 designates the stationary frame of the machine. 3 is a bed which is mounted for vertical movement in the guides 4 and upon which is supported an electric motor 5, which furnishes the driving power for the machine.

The general arrangement of parts thus far described and about to be described will be best understood by reference to Figs. 3, 4, 6 and 7. The bed 3 is supported upon adjusting screws 6, which are shown as provided with worm wheels 7 (see Fig. 6) which are, in turn, actuated by a worm shaft 8. While I have shown this shaft as arranged to be actuated by the application of a wrench to its projecting end portion $8^a$, it may be in any other suitable way. Supported on bed 3 is a center frame $9^a$, having suitable bearings $9^b$, in which is mounted the shaft 10. This shaft has keyed thereto a beveled gear wheel 11, and is driven through the train of spur gears 12, 13, 14 from the motor 5. The shaft 10 is located directly in the transverse vertical plane passing through the center of the gear blank X which is to be cut. Pivoted on bushings in which the shaft 10 is mounted are two oppositely arranged downwardly inclined track members 15, each of which is formed with suitable ways or guides 16, for a slide 17 which forms a support and carrier for the tool mechanism. These two members 17 are arranged to be moved simultaneously toward and away from each other on the track members 15 in inclined planes parallel to the inclination of said track members. The inclination of the latter is parallel to the general angle of the tooth to be cut. Each of the members $17^a$ is provided with a nut 18, fixed thereto (see Fig. 7) and which engages a rotatable screw 19, journaled in suitable bearings 20 on the track member. The upper end of each of these screw shafts carries a beveled pinion 21, which meshes with the gear wheel 11 on the shaft 10, before described. The lower end portion of each track member 15 is adjustably supported by means of shoes 22, resting upon the inclined surfaces of adjustable saddles 23. These saddles are mounted in suitable ways 24, on the base portion of the frame 2, and they are movable toward and from the center of the machine. They may be actuated in any suitable way, as by means of the adjusting screws 25.

By means of the adjustable bed 3 and the adjustments just described, the track members 15 may be set at different angles according to the angularity of the teeth of the particular gear to be cut. In making an adjustment the bed 3 is first elevated or lowered to the desired extent, which may be indicated by a suitable scale, such as that shown at 26, in Fig. 3, and the saddles 23 are then correspondingly adjusted. This adjustment of the members 15 necessitates a corresponding adjustment of the members 17, in order to maintain a horizontal position of those portions of said member which carry the tool mechanism. Accordingly, each member 17 is pivoted at 27 to the relatively fixed portion $17^a$ (see Fig. 7) so that the portion 17 may be adjusted vertically relatively to the portion $17^a$. For the purpose of making and securing these adjustments, I have shown the worm gearing 28; the portions 17 having arcuate slots $17^b$ through which extend rods or bars 29, carried by the portion $17^a$. These rods or bars are provided with the locking nuts 30, whereby the adjustment may be fixed when obtained. These adjustments, as above indicated, provide leveling mechanism for the tool portions of the machine. The mechanisms carried by the two members 17 are duplicates of each other. I will therefore describe one of these in detail and apply the same reference characters to corresponding parts of both sides of the machine.

The numeral 31 designates a shaft or arbor which is parallel with the axis of the gear blank to be cut, and which is mounted in suitable vertically extending supports 32, carried by the member 17. Pivotally mounted on this arbor is an arm 33, which I term a radial arm, the movement of this arm being for the purpose of making the tool touch the contour of the tooth at the same angle during the upward travel of the carriage 17 on the track member 15. This is done since, for correctness of gear tooth shape, it is necessary to maintain the same angle or relation throughout such travel between the tool and the radius vector drawn from the center of the gear blank to the point of contact between tool and tooth. The arm 33 oscillates about the center of the shaft or arbor 31, during each cutting movement of the tool, the extent of this oscillating movement being proportional to the arc of the included angle between the two ends of a half tooth. To impart this oscillating movement to the arm, it is provided with a toothed worm segment 34, which engages a worm pinion 35, on a shaft 36, (see Fig. 8) which is journaled in bearings 37 in the vertically adjustable portion of the carriage 17. This shaft carries a pinion 38, which is connected through a train of gears 39 with a pinion 40, which engages the teeth of a rack 41, on the upper surface of the track member 15. The gears 39 are change gears, so that by the use of the proper set of gears, the extent of the oscillating movement of the radial arm may be made proportional in each case to the arc above referred to.

The numeral 42 (see Fig. 13) designates a tool head whose lower end is in the form of a slide, which hereinafter will be called the tool slide. This slide is secured by gibs to a compensating slide 43, and has a nut 45 (see Fig. 8) engaged by a feed screw 46. The tool head 42 may be, in general, of any approved form, but has the adjustable tool bracket 47 for the tool 48. The adjustment of this tool bracket on the head 42 is effected by means of a swivel base, the bolts 49 and 49ª and the slots 50. The feed screw 46 passes outwardly through a bearing on the compensating slide 43, and the outer end of the screw is provided with a wrench seat 56, by means of which the tool head 42 can be moved in and out in setting the tool for a cut or in changing from one tooth to another.

The regular in-feed of the tool slide and head in cutting each tooth is provided for as follows: The screw 46 carries a sleeve 60, kept from rotating relatively to the screw by means of a feather key. Mounted upon this sleeve between friction washers is a ratchet wheel 57 (see Fig. 8ª) adapted to be engaged by a spring-pressed pawl 58, of a pawl carrier 59. This pawl carrier is mounted at 60 on the end portion of the shaft 46 and has a depending crank arm 61, which is connected at its lower end to an endwise movable rod 62, (see Fig. 3) mounted in bearings 63 on the radial arm 33. This rod has secured thereto a collar 64, between which and the bearing 63 is a compression spring 65. This collar is adapted to engage the upwardly projecting arm 66 of a bell crank member, which also has a depending arm 67, located in the path of a projection 68, on a shipping rod 69, mounted on the carriage 15. The bell crank member 66 and its arm 67 are loosely mounted on the shaft 36, above referred to, as clearly shown in Fig. 8. At the conclusion of each downward movement of the carriage 17, and when the radial arm 33 has moved downwardly, the crank arm 66 engages with the collar 64 on the rod 62. This engagement will move the rod 62 endwise, and thereby, through the pawl-and-ratchet device above described, actuate the feed screw 46 one step to feed the tool for the next cutting stroke.

The reversal of the movement of the carriages at the end of each stroke is effected by an automatically operated master-switch, which controls the circuit of the electric motor 5. In the machine shown, I have indicated for this purpose a master-switch 70 (see Fig. 3) mounted on one of the track members 15, and having link-and-lever-actuating connections 71, which are arranged to be automatically thrown by a shipping rod 72. This shipping rod is carried by the track 15, and is actuated by means of a projecting member from the carriage 17ª, working against adjustable collars on the shipping rod. One end of this rod has a projection 73, adapted for engagement with the trip 74, connected to the link and lever system 71. The latter also has a connection 75, extending to the hand-lever 76. Through the action of the shipping rod and the link-and-lever system, the motor is automatically reversed at the end of each stroke and may be manually reversed at any time by throwing the lever 76.

Each cutting tool in making each of its cutting strokes starts at a point on the gear blank below its central horizontal plane. At the middle of the cutting stroke, the point of the tool is exactly on the center line of the two shafts or arbors 31, and is exactly on the central horizontal plane of the gear blank. At the close of each cutting stroke, the tool point is above this central horizontal plane by a distance exactly equal to the distance at which it starts its cutting operation below said plane. Therefore, the point of the tool in each cutting operation must describe an arc which is equal to the peripheral arc of the included angle between the two ends of the tooth. It is therefore necessary to give the feed slide a compensating in and out movement during each cutting stroke toward and away from the center of the gear blank. This movement will necessarily vary not only with gear blanks of different diameters, but also for each change in the angle of the produced tooth. As will appear by reference to Fig. 8, unless some compensating means were provided, the point of the tool would always swing about the center of the arbor 31. To give the tool its proper varying in and out movement during each cutting operation, I provide the compensator now to be described.

I provide each radial arm with a shaft 55 (see Figs. 8 and 9) mounted in bearings on said radial arm. One end of this shaft carries the slotted lever 54, which engages a sliding block 52, seated in the slot 53. This sliding block is mounted on a pin held securely in the projection 51 of the compensating slide 43. The opposite end of the shaft 55 has a rigid lever 80, carrying the pin 77ª. A fixed pin 78 is secured to a fixed projecting bar 79, securely fastened in a slot on the standard 32. A link 77 connects the pins 77ª and 78. When the radial arm 33 swings to its extreme positions the link 77 will fall along $a'-78$ (see Fig. 8) bringing also the pin 77ª to $a'$, whereas, with the link removed, the pin 77ª would follow the arc $a-a$ with pivot 31 as a center. The angular movement $a-a'$ will cause a corresponding angular movement of the shaft 55. This movement of the shaft 55 will, through the crank arm 54, cause the tool slide 43 to move in and out during each swinging movement of the radial arm. By properly adjusting the center 78 with respect to the center of the arbor 31, this in and out movement may be made exactly correct for a gear blank of any particular diameter and for any particular angle of tooth.

In Figs. 14 and 15, I have shown in detail one method of obtaining a close and accurate adjustment of the center 78. As shown in these figures, the link 77 is provided with a plurality of holes 77$^b$, through any of which the pin 78 may be inserted to thus vary the distance between the center of the pin 78 and the center of the arbor 31. This gives a coarse adjustment. To provide a finer adjustment, the end portion of the link 77 has a slot or window 81 in which is seated an adjustable slide block 82, provided with an adjusting and clamping screw 83, and through which passes the pin 77$^a$, to the link arm 80. Clamp bolts 83$^a$ are also preferably provided for holding the adjustment of the block 82. By these two adjustments, the arc of movement of the shaft 55 and the corresponding in and out movement of the tool slide may be accurately controlled.

The operation of the machine will now be readily understood. The gear blank X to be cut is rigidly connected at one end of the indexing shaft or spindle 83 (see Fig. 1) and at its opposite end is rigidly clamped in the tail bearing of the indexing mechanism. Any suitable clamp may be used, this forming no part of my invention. A clamping device for this purpose is indicated at 84 in Fig. 1. In Figs. 18 and 19 I have illustrated one form of tail support or bearing consisting of a rigid frame 84 having the supporting surface 85$^a$ for a portion of the shaft of the blank, this surface being preferably provided with the inset clamp members 86. 87 is a lever pivoted at 88 and carrying a clamp member 89 adapted to engage the periphery of said shaft portion in the manner indicated. Connected to the opposite arm of the lever is a link 90 which in turn is connected to a crank arm 91 of a short shaft 92 journaled in the frame 84. 93 is a lever for actuating said shaft to thereby move the lever 87 into and out of clamping position. The shaft of the blank being rigidly connected at its opposite end to the indexing mechanism as indicated in Fig. 1, and being clamped in the manner described at its tail end, the blank will be effectively held against rotation or other movement during the cutting operations. Obviously, however, various forms of clamping means may be employed for the blank, and I do not make any claim herein for the specific clamping devices shown. The blank being properly set and the machine correctly adjusted to the particular gear to be cut, the motor 5 is started. Through the screws 19, the carriages 17 are simultaneously reciprocated on the adjustable inclined tracks 15. The two tools act simultaneously as the carriages move upwardly toward the center line of the machine. During this upward movement, the radial arms 33 are swinging upwardly about the centers of the arbors 31, thereby keeping the points of the cutting tools at all times in substantially radial relation to the center of the blank X. The compensating device before described during this movement gives the proper in and out movement of the cutting tools toward and away from the center of the blank. Inasmuch as the tools are kept in the same relation to the radius vector drawn from the center of the gear blank to the cutting point of the tool during the entire cutting stroke, the helical formation of the tooth results, the angle of the tooth being parallel with the angle at which the track members 15 are set, and the extent of oscillation of the radial arms being proportional to the included angle of the teeth and determined by the particular change gears 39 which are employed. On the return or downward movement of the carriages, the automatic feed mechanism described advances the tool slide the proper distance for the next cut. These operations are continued until one face of each complete tooth is finished. Usually, the gear blanks are cast or forged with a rough approximation of the tooth forms thereon, the machine planing and finishing these rough teeth. The blank is provided either with the central clearance groove $x$, shown in Fig. 3, or with clearance spaces $x'$, shown in Fig. 1. When the tooth is finished, the tool slides are retracted by hand through the medium of a wrench applied at 56 to the end of the feed screw 46. The indexing mechanism is then actuated to rotate the blank one step. The blank is then again firmly and rigidly clamped, and the cutting operations proceeded with on the next tooth. The proper cross sectional form of the teeth is produced by means of the usual former 85. (See Figs. 3, 6, 9 and 13.) Various forms of planing tools may be employed. In Figs. 20, 21 and 22 I have shown one well known form of tool which can be used. In these figures the cutting edge of the tool is at 48$^a$.

The advantages of my invention will be apparent to those familiar with this art. It provides a simple and powerful machine capable of handling heavy work and which can be readily adjusted for any particular gear or pinion which it may be desired to cut. The gearing in the machine is reduced to a minimum and the construction and mode of operation is such that there is very little lost motion, thus reducing to a minimum the errors in the produced tooth. The machine is rapid in its work. As above stated, any usual indexing mechanism may be employed, such as that used with spur gear cutters, since the indexing mechanism has nothing to do except to impart indexing movements to the blank.

I claim:

1. A machine for cutting helical gears, having a reciprocating tool-carrying carriage mounted to travel in a plane parallel to the general angular plane of the teeth to be cut, a tool carrier on said carriage, and means for imparting another movement to said tool carrier to maintain the tool in constant relation to the radius vector from the center of the gear blank to the cutting point of the tool during the cutting movement of said carriage, substantially as described.

2. A machine for cutting helical gears, having a reciprocating tool-carrying carriage mounted to travel in a plane parallel to the general angular plane of the teeth to be cut, together with a vertically adjustable track for said carriage, substantially as described.

3. A machine for cutting helical gears, having a reciprocating tool-carrying carriage mounted to travel in a plane parallel to the general angular plane of the teeth to be cut, and a vertically oscillating tool-carrying arm mounted on said carriage, substantially as described.

4. A machine for cutting helical gears, having a reciprocating tool-carrying carriage mounted to travel in a plane parallel to the general angular plane of the teeth to be cut, and a vertically oscillating tool-carrying arm mounted on said carriage, said arm having leveling means, substantially as described.

5. A machine for cutting helical gears, having a reciprocating tool-carrying carriage mounted to travel in a plane parallel to the general angular plane of the teeth to be cut, and a vertically oscillating tool-carrying arm mounted on said carriage, and a compensating device for effecting an in and out movement of the tool during each cutting operation, substantially as described.

6. A machine for cutting helical gears, comprising a carriage mounted to reciprocate in an inclined plane, an oscillating radial arm mounted on said carriage, and a tool support mounted on said arm, substantially as described.

7. A machine for cutting helical gears, comprising a carriage mounted to reciprocate in an inclined plane, an oscillating radial arm mounted on said carriage, and a tool support mounted on said arm, together with means for imparting a feeding movement to said tool between successive cutting movements of the carriage, substantially as described.

8. A machine for cutting helical gears, comprising a carriage mounted to reciprocate in an inclined plane, an oscillating radial arm mounted on said carriage, and a tool support mounted on said arm, together with means for imparting a feeding movement to said tool between successive cutting movements, and also means for imparting an in-and-out movement to the tool-support during each cutting stroke, substantially as described.

9. A machine for cutting helical gears, comprising a carriage mounted to reciprocate in an inclined plane, a tool carrier mounted on said carriage, and means for imparting a swinging movement to the tool carrier during the movement of the carriage to maintain the tool in constant relation to the radius vector from the center of the gear blank to the cutting point of the tool, substantially as described.

10. A machine for cutting helical gears, comprising a carriage mounted to reciprocate in an inclined plane, a tool carrier mounted on said carriage, and means for imparting a swinging movement to the tool carrier during the movement of the carriage to maintain the tool in constant relation to the radius vector from the center of the gear blank to the cutting point of the tool, together with means for imparting an in-and-out reciprocating movement to the tool carrier while it is swinging, substantially as described.

11. A machine for cutting helical gears, comprising a carriage mounted to reciprocate in an inclined plane, a tool carrier mounted on said carriage, and means for imparting a swinging movement to the tool carrier during the movement of the carriage to maintain the tool in constant relation to the radius vector from the center of the gear blank to the cutting point of the tool, together with means for imparting an in-and-out reciprocating movement to the tool carrier while it is swinging, and means for varying the extent of the said in-and-out movement, substantially as described.

12. A machine for cutting helical gears, comprising an adjustable inclined track, a carriage mounted to reciprocate thereon, leveling means for the carriage, an oscillating arm mounted on the carriage, a tool slide mounted on the arm, means for imparting a feeding movement to the tool slide, and means for imparting an in-and-out movement to the said slide during the swinging movement of the arm, substantially as described.

13. A machine for cutting helical gears, comprising an adjustable inclined track, a carriage mounted to reciprocate thereon, leveling means for the carriage, an oscillating arm mounted on the carriage, a tool slide mounted on the arm, means for imparting a feeding movement to the tool slide, and means for imparting an in-and-out movement to the said slide during the swinging movement of the arm, together with a compensator for varying the extent of such in-and-out movement, substantially as described.

14. A machine for cutting helical gears, comprising an oscillating arm, and a tool carrier and tool mounted on said arm, said arm having its axis of movement parallel to the axis of the gear being cut, substantially as described.

15. A machine for cutting helical gears, comprising an oscillating arm, and a tool-carrier and tool mounted on said arm, said arm having its axis of movement parallel to the axis of the gear being cut, together with means for effecting a reciprocatory movement of said arm in an inclined plane during its oscillating movement, substantially as described.

16. A machine for cutting helical gears, comprising an oscillating arm, and a tool-carrier and tool mounted on said arm, said arm having its axis of movement parallel to the axis of the gear being cut, together with means for effecting a reciprocating movement of said arm in an inclined plane during its oscillating movement, and means for moving the tool slide and tool toward and away from the blank during said movement, substantially as described.

17. In a machine for cutting helical gears, the combination with an indexing mechanism having means for holding a blank rigidly against movement between successive indexing movements, a cutter carriage, means for reciprocating said carriage in a plane substantially parallel to the general plane of the tooth to be cut, and means for maintaining the tool in constant relation to the radius vector from the center of the gear blank to the cutting point of the tool, substantially as described.

18. In a machine for cutting helical gears, the combination with an indexing mechanism having means for holding a blank rigidly against movement between successive indexing movements, a cutter carriage, means for reciprocating said carriage in a plane substantially parallel to the general plane of the tooth to be cut, and means for maintaining the tool in constant relation to the radius vector from the center of the gear blank to the cutting point of the tool, together with mechanism for moving the tool toward and away from the axis of the blank during its cutting movement, substantially as described.

19. In a machine for cutting double helical gears, two track members inclined in opposite directions, a cutter carriage mounted to reciprocate on each track member, and means for simultaneously reciprocating said carriages, each carriage having a movable tool supporting arm, and means for swinging said arm as the carriage is reciprocated, substantially as described.

20. In a machine for cutting double helical gears, two track members inclined in opposite directions from a common center, a cutter carriage mounted to reciprocate on each track member, means for simultaneously reciprocating said carriages, and means for vertically adjusting such common center and for adjustably supporting the lower end portions of said members, substantially as described.

21. In a machine for cutting double helical gears, two track members inclined in opposite directions, a cutter carriage mounted to reciprocate on each track member, means for simultaneously reciprocating said carriages, a vertically oscillating radial arm mounted on each of said carriages, and carrying a tool, and means for simultaneously oscillating said arms, substantially as described.

22. In a machine for cutting double helical gears, two track members inclined in opposite directions, a cutter carriage mounted to reciprocate on each track member, means for simultaneously reciprocating said carriages, a vertically oscillating radial arm mounted on each of said carriages, and carrying a tool, and means for simultaneously oscillating said arms, together with means for varying the extent of their oscillating movements, substantially as described.

23. In a machine for cutting double helical gears, two track members inclined in opposite directions, a cutter carriage mounted for reciprocation on each of said members, a radial oscillating arm mounted on each carriage, a tool slide mounted on each arm, means for simultaneously reciprocating both carriages, and means for simultaneously swinging both arms during the reciprocating movements of the carriages, substantially as described.

24. In a machine for cutting double helical gears, two track members inclined in opposite directions, a cutter carriage mounted for reciprocation on each of said members, a radial oscillating arm mounted on each carriage, a tool slide mounted on each arm, means for simultaneously reciprocating both carriages, and means for simultaneously swinging both arms during the reciprocating movements of the carriages, together with means for moving each tool slide toward and away from the center of the blank during each cutting stroke of the tool, substantially as described.

25. In a machine for cutting double helical gears, two track members inclined in opposite directions, a cutter carriage mounted for reciprocation on each of said members, a radial oscillating arm mounted on each carriage, a tool slide mounted on each arm, means for simultaneously reciprocating both carriages, and means for simultaneously swinging both arms during the reciprocating movements of the carriages, together with means for moving each tool slide toward and away from the center of the blank during each cutting stroke of the tool, and means for changing the angle of inclination of said track members, substantially as described.

26. In a machine for cutting double helical gears, two track members inclined in opposite directions, a cutter carriage mounted for reciprocation on each of said members, a radial oscillating arm mounted on each carriage, a tool slide mounted on each arm, means for simultaneously reciprocating both carriages, means for simultaneously swinging both arms during the reciprocating movements of the carriages, together with means for moving each tool slide toward and away from the center of the blank during each cutting stroke of the tool and means for changing the angle of inclination of said track members, substantially as described.

27. In a machine for cutting double helical gears, two track members inclined in opposite directions, a cutter carriage mounted for reciprocation on each of said members, a radial oscillating arm mounted on each carriage, a tool slide mounted on each arm, means for simultaneously reciprocating both carriages, means for simultaneously swinging both arms during the reciprocating movements of the carriages, together with means for moving each tool slide toward and away from the center of the blank during each cutting stroke of the tool, and means for changing the extent of the oscillating movements of the radial arms, substantially as described.

28. In a machine for planing double helical gears, two oppositely inclined track members, a longitudinal screw-shaft on each member, a cutter carriage engaging each screw, and motive means for simultaneously actuating both screws, substantially as described.

29. In a machine for planing double helical gears, a swinging tool-carrying arm, a tool slide mounted thereon, gearing for oscillating said arm, and connections operated by the movement of the arm for effecting an in-and-out movement of the tool slide during each cutting stroke of the tool, substantially as described.

30. In a machine for planing double helical gears, two oppositely inclined track members, a longitudinal screw-shaft on each member, a cutter carriage engaging each screw, and motive means for simultaneously actuating both screws, together with means for periodically reversing the motive means, substantially as described.

31. In a machine for planing double helical gears, two oppositely inclined track members, a tool carriage mounted to reciprocate on each of said members, gearing for reciprocating said carriages, a swinging tool-carrying arm mounted on each carriage and having a gear segment, and rack and pinion mechanisms operated by the reciprocating movement of the carriages for actuating said gear segments, substantially as described.

32. In a machine for cutting double helical gears, two track members inclined in opposite directions, a cutter carriage mounted for reciprocation on each of said members, a radial oscillating arm mounted on each carriage, a tool slide mounted on each arm, means for simultaneously swinging both arms during the reciprocating movements of the carriages, together with means for moving each tool slide toward and away from the center of the blank during each cutting stroke of the tool, means for changing the angle of inclination of said track members, and other means for imparting a feeding movement to the tool slide between successive cutting strokes, substantially as described.

33. A machine for cutting double helical gears, comprising an indexing and blank supporting mechanism having means for rigidly securing a gear blank against rotation between successive indexing operations, two cutter carriages mounted to reciprocate in oppositely inclined planes toward and away from the central vertical plane of said blank, and a tool support mounted on each carriage, together with means for moving said supports to maintain the cutting tools in constant relation to the radius vector from the center of the gear blank to the cutting point of the tool during the movements of said carriages, substantially as described.

34. A machine for cutting double helical gears, comprising an indexing and blank supporting mechanism having means for rigidly securing a gear blank against rotation between successive indexing operations, two cutter carriages mounted to reciprocate in oppositely inclined planes toward and away from the central vertical plane of said blank, and a tool support mounted on each carriage, together with means for moving said supports to maintain the cutting tools in radial relation to the center of the blank during the movements of said carriages, and other means for effecting a movement of the cutter points toward and away from the axis of the blank during each cutting stroke, substantially as described.

In testimony whereof, I have hereunto set my hand.

LORENZ IVERSEN.

Witnesses:
F. W. KREIGELSTEINER,
W. W. POWELL.